United States Patent
Kusmiss et al.

[11] Patent Number: 6,039,628
[45] Date of Patent: Mar. 21, 2000

[54] SELF-MOBILE CAT TOY

[76] Inventors: John H. Kusmiss, 11160 Langmuir Ave., Sunland, Calif. 91040; Naomi Caryl, 2071 Castilian Dr., Los Angeles, Calif. 90068-2608

[21] Appl. No.: 08/333,602

[22] Filed: Nov. 2, 1994

Related U.S. Application Data

[63] Continuation of application No. 08/114,821, Sep. 2, 1993, abandoned.

[51] Int. Cl.[7] .................................................. A63H 29/00
[52] U.S. Cl. ...................... 446/457; 446/290; 446/298; 446/353; 446/456
[58] Field of Search .................................... 446/484, 290, 446/291, 297, 298, 303, 353, 354, 431, 462, 457, 175, 454, 456, 270, 279, 280

[56] References Cited

U.S. PATENT DOCUMENTS

| | | | |
|---|---|---|---|
| 3,199,249 | 8/1965 | Carver et al. | 446/290 |
| 3,481,070 | 12/1969 | Baulard-Cogan | 446/354 X |
| 3,500,579 | 3/1970 | Bryer | 446/484 X |
| 3,935,669 | 2/1976 | Potrzuski et al. | 446/485 |
| 4,272,916 | 6/1981 | Giordano et al. | 446/290 X |
| 4,318,245 | 3/1982 | Stowell et al. | 446/303 X |
| 5,152,708 | 10/1992 | Claugus et al. | |
| 5,195,920 | 3/1993 | Collier | 446/484 X |
| 5,209,695 | 5/1993 | Rothschild | 446/175 |
| 5,221,226 | 6/1993 | Park | 446/353 |

*Primary Examiner*—Robert A. Hafer
*Assistant Examiner*—Jeffrey D. Carlson
*Attorney, Agent, or Firm*—John H. Kusmiss

[57] ABSTRACT

A self-mobile cat toy capable of simulating intermittent life includes a rodent-like shell partially or wholly containing an electrical power source mechanically and electrically connected to motor-powered wheels or a tread mechanism for moving along the ground. The power circuit includes an orientation-dependent switch which is closed or open depending on its orientation, so that when played with by a cat, the toy will cease to move in certain orientations and begin to move when pawed into other orientations. In another embodiment the powered wheels or tread are replaced by a vibrating mechanism. In yet other embodiments the cat toy is externally controlled by the pet owner, through either a long cable with a switch at the end or through a radio or ultrasonic transmitter-receiver system.

15 Claims, 2 Drawing Sheets

SELF-MOBILE CAT TOY

This application is a continuation of application Ser. No. 08/114,821, filed Sep. 2, 1993, abandoned.

BACKGROUND OF THE INVENTION

1. Field of the Invention

This invention relates to amusement devices for pets, and in particular to an internally powered cat toy which is able to move by itself, or in response to external commands.

2. Description of the Prior Art

Cats have been around since the time of the Egyptian pharaohs, and their owners have sought to entertain them in various ways over the centuries. Notoriously playful animals, especially when young, cats are also driven by instinctual hunting desires to chase moving objects, particularly objects that may only vaguely resemble a mouse. Cat owners are required to simulate lifelike motion of the various cat toys which are available in order to keep their pets amused. Cats soon lose interest in an object that does not move, and the effort involved in keeping a cat amused soon causes the average cat owner's enthusiasm to pall.

SUMMARY OF THE INVENTION

In view of the problems traditionally associated with inert cat toys that must be moved around manually, it is an object of this invention to provide a novel and improved cat toy which is self-mobile, so that the cat owner can relax while his pet amuses itself in playing with a toy that simulates intermittent life.

In a preferred embodiment the invention comprises an electrically motor-driven mechanism encased in a soft outer covering, with the power supply to the motor connected to it via a position-dependent switch, such as a mercury switch. In one orientation, the switch provides a closed conductive path from the power supply to the motor. In other orientations the conductive path between the power supply and the motor is interrupted. Thus, the self-mobile cat toy may be initially set in motion, but when pounced upon and struck so as to change its positional orientation, will cease to move. Then, in the course of being pawed by a playful feline, the self-mobile cat toy will from time to time assume the orientation necessary to again simulate life.

The cat toy of the invention is provided with motor-powered wheels or a tread mechanism for moving along the ground. In another embodiment the powered wheels or tread are replaced by a vibrating mechanism. In yet other embodiments the cat toy is externally controlled by the pet owner, through either a long electrical cable with a switch and/or battery at the end or through a radio or ultrasonic transmitter-receiver system which employs electromagnetic or sonic control signals.

These and other features and advantages of the invention will be apparent to those skilled in the art to which this invention pertains, from the following detailed description of preferred embodiments, taken together with the accompanying drawings, in which:

DETAILED DESCRIPTION OF PREFERRED EMBODIMENTS

Figure 1:
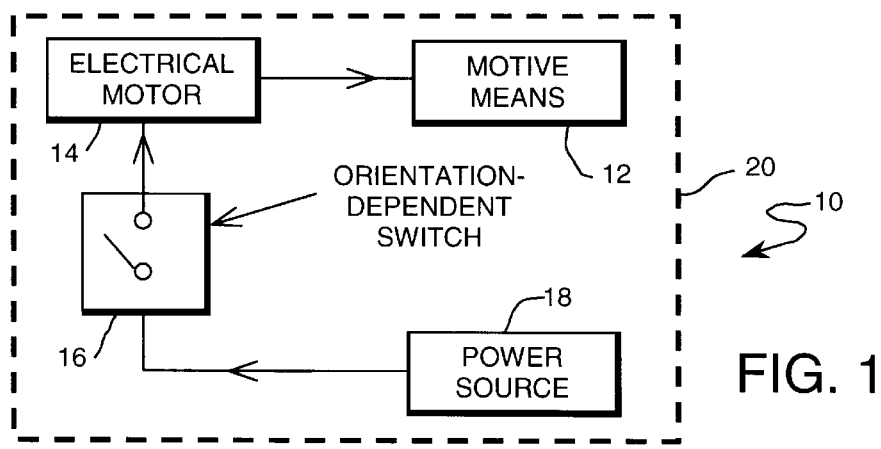
FIG. 1 is a schematic block diagram of the invention.

Referring to FIG. 1, one can see the arrangement of the various components of the present invention in a schematic block diagram. A self-mobile cat toy 10 comprises motive means 12 operatively connected to an electrical motor 14 which is electrically connected through an orientation-dependent switch 16 to a source of electrical power 18.

Motive means 12 can take various forms, such as an arrangement of one or more wheels or a tank-like tread mechanism which enables cat toy 10 to move along the ground when switch 16 is oriented in such a way that it is closed, allowing current to flow from power source 18 to electric motor 14.

A mercury switch is a well-known type of orientation-dependent switch, consisting of a globule of liquid metallic mercury sealed inside a glass ampule with two spaced-apart conductive leads that communicate with the interior of the ampule through the glass envelope. When the orientation of the mercury switch is such that the globule of liquid mercury connects the interior ends of the conductive leads, current flows through the mercury and the switch is closed. When the orientation of the mercury switch is such that the globule of liquid mercury does not connect the interior ends of the conductive leads, there is a gap in the circuit and the switch is open.

Power source 18 can be a variety of different cells or batteries matched to the power requirements of electrical motor 14. Small dc motors are available to run at various voltages, such as the 1.5 Volts of emf provided by conventional AAA, AA, C, or D batteries. The power source 18 could be of the rechargeable type or could consist of solar cells.

Figure 2:
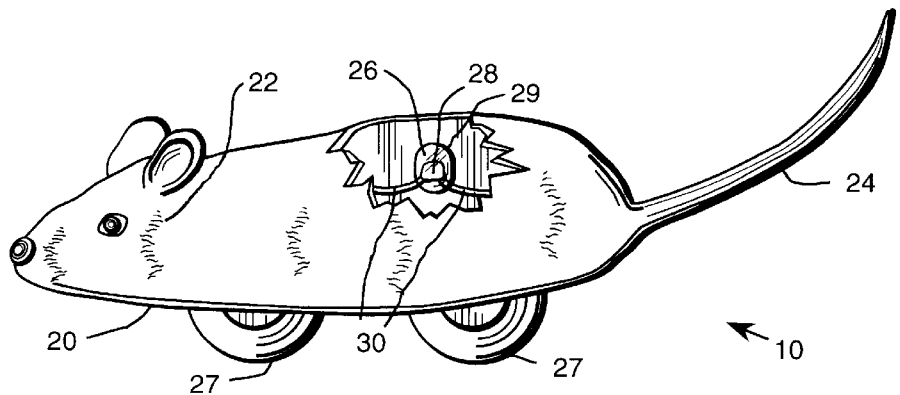
FIG. 2 is a perspective drawing, partly broken away, of a first embodiment of the invention, showing the position-dependent internal switch.

Components 12, 14, 16, and 18 are contained wholly or partially within a structural shell 20 of some sort made of a suitable plastic or metal material. The exterior of shell 20 is preferably painted gray or brown or covered with a gray or brown fabric or fur-like material 22 to simulate a rodent, as shown in FIG. 2. A tail 24 increases the resemblance of cat toy 10 to a rodent.

A mercury switch 26 is shown inside shell 20, oriented so that the switch is closed and power is supplied to an internal electric motor 14 when wheels 27 are in contact with the ground. Mercury globule 28 can be seen in FIG. 2 inside glass ampule 29 providing a bridging electrical connection between the two conducting leads 30 communicating with the interior of the switch.

Figure 3:
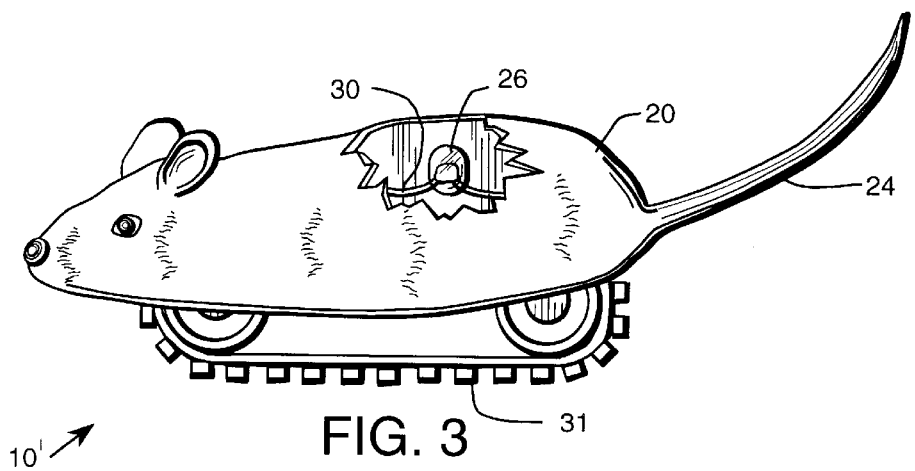
FIG. 3 is a perspective drawing, partly broken away, of a second embodiment of the invention.

An alternative embodiment 10' of the invention is depicted in FIG. 3, comprising a simulated rodent with a continuous tread 31 arrangement for moving the toy via an internal electric motor 14, connected as before to a power source 18 via an orientation-dependent mercury switch 26. Switch 26 is positioned inside shell 20 in such a way that it is closed when tread 30 is in contact with the ground.

Figure 4:
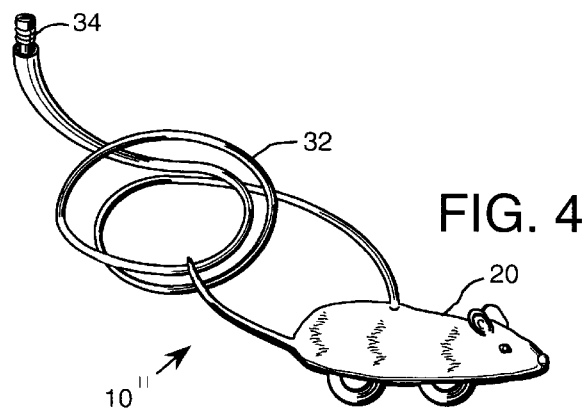
FIG. 4 is a perspective drawing of a third embodiment of the invention employing a cable for remote control.

FIG. 4 shows another embodiment 10" of the invention additionally comprising a two-wire cable 32 with a switch 34, preferably of the pushbutton type, which electrically connects the distal ends of the two wires. In this embodiment ordinary switch 34 replaces the orientation-dependent switch 16. Power source 18 could also be external to shell 20 in proximity to switch 34 at the distal end of cable 32. A cat owner is able to close or open switch 34 to make the cat toy move or stop moving, respectively, while a cat plays with the toy.

Figure 5:
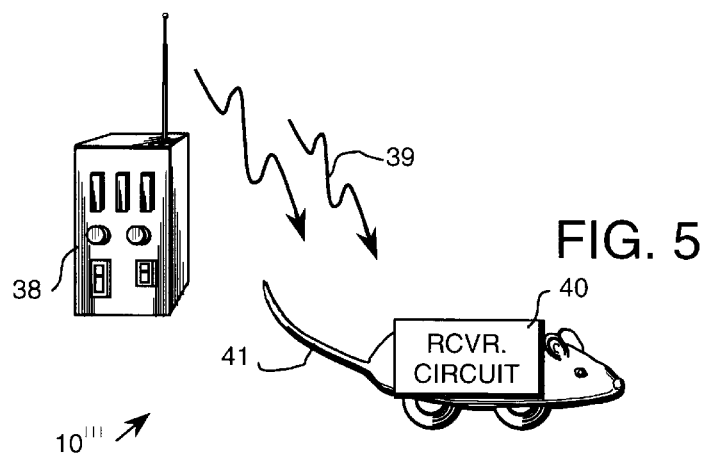
FIG. 5 is a part perspective, part schematic drawing of a fourth embodiment of the invention employing a wireless remote control arrangement.

In yet another embodiment 10''' of the invention, cable 32 is replaced by a remote control arrangement to close or open a switch 36 inside the cat toy. One possibility is a remote radio-frequency source 38 which broadcasts signals 39 that are picked up by an internally located receiver circuit 40 inside the cat toy and used to effect a power connection between power source 18 and motor 14, as indicated by FIG. 5. A receiving antenna 41 consisting of a short length of flexible wire may be concealed within tail 24. The remaining details of such an electromagnetic transmission-reception control arrangement are not given here because they are well within the ability of anyone ordinarily skilled in the art. Similarly, an acoustic (preferably ultrasonic) sound source could be used to emit sound signals which are detected and employed to activate a switching arrangement inside the cat toy.

Figure 6:
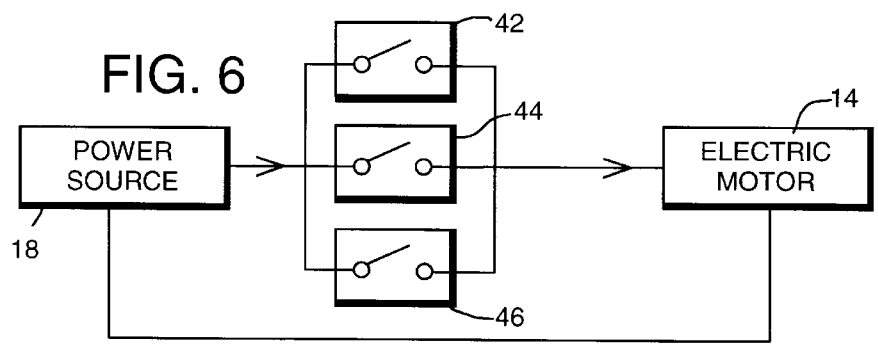
FIG. 6 is a schematic circuit diagram showing a multiple switch arrangement.

Another embodiment of the cat toy of the invention might make use of an orientation-dependent switching system comprising a plurality of mercury switches disposed in a plurality of different positions so as to conduct electricity when the toy is oriented in certain positions but not to conduct when the toy is not so oriented. FIG. 6 shows one possible multiple-switch arrangement.

A first orientation-dependent switch 42 is connected in series with an electrical motor 14 and a source of electrical power 18. Connected in parallel with first switch 42 are second and third orientation-dependent switches 44 and 46, respectively. The three switches 42, 44, and 46 have different individual orientations inside the cat toy 10; one or more of them will be closed and conduct electricity when cat toy 10 is given a suitable orientation while being played with by a cat.

Figure 7:
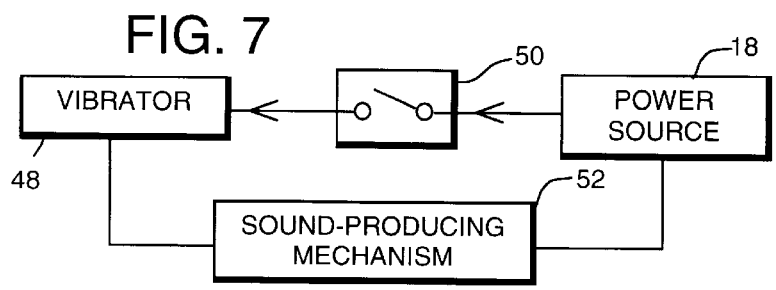
FIG. 7 is another embodiment employing a vibrator.

In yet another embodiment, shown in FIG. 7, a vibrator 48 is used to set up vibrations in the cat toy, with the rest of the arrangement substantially the same as described above. The vibrator 48 is driven by power source 18 and an intermittent switch 50 allows for intermittent connection of power source 18 to vibrator 48. As described above for the various other embodiments, intermittent switch 50 can be an orientation-dependent switch, a pushbutton switch at the end of an external cable, or a switch that is remotely controlled by electromagnetic or sonic signals.

As an additional feature of any of the embodiments described above, it would be possible to add an electrical sound-producing mechanism 52 to produce mouselike squeaks in synchrony with activation of the motive mechanism of the cat toy. The design of the circuitry and choice of components to do this is well within the ability of anyone ordinarily skilled in the art.

Field Trials of a Prototype

Tests were conducted with a prototype self-mobile cat toy and three different cats. The prototype consisted of a battery-driven toy tank approximately 3×5×2 cm in size, with a slide switch provided to activate the motor that drove the treads of the tank. This toy was modified by inserting a mercury switch (obtainable at Radio Shack stores) in the power supply circuit to the motor. Trials were carried out on three separate occasions with three different cats.

The first trial, with a Persian cat with a skittish disposition named Cubby, showed that the prototype cat toy held a definite fascination for the feline mentality. Although the mechanism of the prototype made a rather loud noise which caused Cubby to retreat before the moving prototype, when it stopped moving by virtue of running into a wall or irregularity in the carpet, Cubby responded with the stereotypical interest of a cat ready to pounce on a mouse.

It should be mentioned that the toy tank had its turret removed but was otherwise undisguised, so that it looked like a plastic toy tank with a glass mercury switch attached to it. The most encouraging part of the first trial with a cat was the fact that after one occasion when the self-mobile cat toy had stopped, and the two human observers had lost interest in the trial, their interest was suddenly reawakened after a considerable time had elapsed, by a sudden dash across the room by Cubby to pounce on the toy which had lain inert during this time.

The second trial took place with a young cat of the American short-haired variety named Moonie. This cat, though less skittish in nature than the cat of the first trial, also seemed apprehensive of the noise made by the prototype self-mobile cat toy of the present invention. Like its predecessor in the first trial, Moonie evinced substantial interest in the prototype self-mobile cat toy, although it took quite a long time to work up its nerve to start pawing the toy after it stopped moving.

The third trial was with a long-haired hybrid named Putters, which exhibited roughly the same type of behavior as its two predecessors had. Again there was the tendency to retreat in the face of the noisy moving prototype, and considerable reticence in investigating and touching the prototype once it had stopped moving. The field trials of the toy indicate that it should be as quiet in its operation as possible, except, perhaps, for mouselike sounds artificially generated by the toy.

Those having skill in the arts relevant to the present invention will undoubtedly think of various modifications or additions to the invention based upon the embodiments disclosed herein. For example, in the embodiment 10'' employing an external switch 34, any type of switch known in the art can be used, such as a slide switch or a microswitch. Similarly, orientation-dependent switch 16 is not intended to be limited to a mercury switch, but can be any type of orientation-dependent switch known in the art. Therefore, it should be understood that the invention is not to be limited to the disclosed embodiments, but is to be limited only by the following claims.

We claim:

1. A cat toy simulating intermittent life, comprising:
   a shell simulating the exterior of a small nonhuman animal defining an interior volume; and
   means for intermittenly moving substantially inside said volume and attached to said shell for intermittently moving said toy along the ground, said means for intermittenly moving operable by direct mechanical actions of a cat playing with said cat toy, said actions involving actual physical contact of said cat with said toy to alter a spatial orientation of said toy.

2. The cat toy of claim 1 wherein said means for intermittenly moving comprises:
   motor means for providing mechanical output energy in response to electrical input energy;
   a tread-like mechanism attached to said shell including a continuous belt operatively connected to said motor means;
   power means for powering said motor means; and switching means for intermittent connection of said power means to said motor means.

3. The cat toy of claim 1 wherein said means for intermittenly moving comprises:

at least one wheel extending beyond said shell;

driving means for driving said at least one wheel;

power means for powering said driving means; and switching means for intermittent connection of said power means to said driving means.

4. The cat toy of claim 1 further comprising squeaking means for emitting squeaking sounds in synchrony with an activation of said power means.

5. The cat toy of claim 2 wherein said switching means comprises at least one orientation-sensitive switch, a first of said at least one switch being connected in series with said motor means and said power means, and any said switches in excess of said first switch being connected in parallel with said one switch and with each other.

6. The cat toy of claim 5 wherein said at least one orientation-sensitive switch comprises a mercury switch.

7. The cat toy of claim 2 wherein said switching means comprises a mercury switch.

8. The cat toy of claim 2 further comprising sound-producing means for simulating the squeak of a mouse.

9. The cat toy of claim 2 wherein said shell comprises a soft material simulating the exterior of a small animal.

10. A cat toy simulating intermittent life, comprising:

small animal means for simulating the shape and appearance of a small nonhuman animal;

means for moving in said small animal means for moving said small animal means along the ground; and an orientation-dependent switch in said small animal means, operatively connected to said means for moving for turning said means for moving on or off depending upon an orientation of said small animal means, said switch operable by direct mechanical actions of a cat playing with said cat toy, said actions involving actual physical contact of said cat with said toy to alter a spatial orientation of said toy.

11. The cat toy of claim 10 wherein said means for moving comprises a small electrical motor electrically connected serially to a battery source and to said switch and mechanically connected to at least one wheel on an underside of said small animal means.

12. The cat toy of claim 11 wherein said orientation-dependent switch comprises a mercury switch oriented so as to conduct electricity when said small animal means is in an upright position with said at least one wheel in contact with the ground but not to conduct when said small animal means is not so oriented.

13. The cat toy of claim 10 wherein said means for moving comprises a small electrical motor electrically connected serially to a battery source and to said switch and mechanically connected to a continuous tank-like tread on said small animal means.

14. The cat toy of claim 13 wherein said orientation-dependent switch comprises a mercury switch oriented so as to conduct electricity when said small animal means is in an orientation with said tread in contact with the ground but not to conduct when said small animal means is not so oriented.

15. The cat toy of claim 10 wherein said orientation-dependent switch comprises a plurality of mercury switches disposed in a plurality of different positions so as to conduct electricity when said small animal means is oriented in certain positions but not to conduct when said small animal means is not so oriented.

* * * * *